United States Patent
Ito et al.

(10) Patent No.: US 10,846,414 B2
(45) Date of Patent: Nov. 24, 2020

(54) INFORMATION PROCESSING SYSTEM, INFORMATION PROCESSING METHOD, AND NON-TRANSITORY COMPUTER READABLE MEDIUM

(71) Applicant: FUJI XEROX CO., LTD., Tokyo (JP)

(72) Inventors: Yasuhiro Ito, Yokohama (JP); Kiyoshi Tashiro, Yokohama (JP); Toshiharu Yokoyama, Yokohama (JP); Tomoyuki Shimizu, Yokohama (JP); Ken Ichikawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 288 days.

(21) Appl. No.: 15/442,211

(22) Filed: Feb. 24, 2017

(65) Prior Publication Data
US 2018/0012029 A1    Jan. 11, 2018

(30) Foreign Application Priority Data
Jul. 11, 2016    (JP) .................................. 2016-137097

(51) Int. Cl.
G06F 21/00    (2013.01)
H04L 29/06    (2006.01)
G06F 21/60    (2013.01)
G06F 21/62    (2013.01)
H04L 9/32    (2006.01)
(Continued)

(52) U.S. Cl.
CPC ........ *G06F 21/604* (2013.01); *G06F 21/6218* (2013.01)

(58) Field of Classification Search
CPC .......................... G06F 21/604; G06F 21/6218
See application file for complete search history.

(56) References Cited

U.S. PATENT DOCUMENTS

2009/0025065 A1    1/2009  Fujino
2011/0321147 A1*  12/2011  Chakra ............... G06F 21/6218
                                                         726/9
(Continued)

FOREIGN PATENT DOCUMENTS

JP    H06-195307 A    7/1994
JP    2004-240891 A    8/2004
JP    2008-084197 A    4/2008
(Continued)

OTHER PUBLICATIONS

Faraz Fatemi Moghaddam; Shiva Gerayeli Moghaddam; Sohrab Rouzbeh; Sagheb Kohpayeh Araghi; Nima Morad Alibeigi; Shirin Dabbaghi Varnosfaderani; "A scalable and efficient user authentication scheme for cloud computing environments"; Year: Mar. 2014; Conference Paper; Publisher: IEEE; pp. 508-513 (Year: 2014).*

(Continued)

*Primary Examiner* — Fatoumata Traore
*Assistant Examiner* — Courtney D Fields
(74) *Attorney, Agent, or Firm* — Oliff PLC

(57) ABSTRACT

An information processing system grants an access right to data to a registered user, and includes a receiving unit and a granting unit. The receiving unit receives information on an unregistered user who is to be granted with an access right to specific data. The granting unit grants the access right to the specific data to the unregistered user after the unregistered user has been registered.

9 Claims, 12 Drawing Sheets

(51) Int. Cl.
*H04W 12/06* (2009.01)
*H04L 9/30* (2006.01)

(56) References Cited

U.S. PATENT DOCUMENTS

2014/0256285 A1* 9/2014 Koo ................ H04W 4/24
455/406
2015/0095988 A1* 4/2015 Hirakata .......... G06F 17/30958
726/4

FOREIGN PATENT DOCUMENTS

| JP | 2008-225741 A | | 9/2008 | |
|----|---------------|---|--------|---|
| JP | 2009-025946 A | | 2/2009 | |
| KR | 20120069649 A | * | 6/2012 | ............ H04L 9/32 |

OTHER PUBLICATIONS

Mar. 24, 2020 Office Action issued in Japanese Patent Application No. 2016-137097.

* cited by examiner

| Name | Full-Width Family Name [ ] Given Name [ ] |
|---|---|
| Furigana | Full-Width Family Name [ ] Given Name [ ] |
| Name of Work Site | Full-Width [ ] |
| Name of Department | Full-Width [ ] |
| ZIP Code of Work Site | Half-Width [ ] - [ ] |
| Address of Work Site | [ ] |
| Name of Building | [ ] |
| Phone Number | Half-Width [ ] - [ ] - [ ] |
| Email Address | Half-Width [ ] |
| | Enter the Email Address for Confirmation. [ ] |

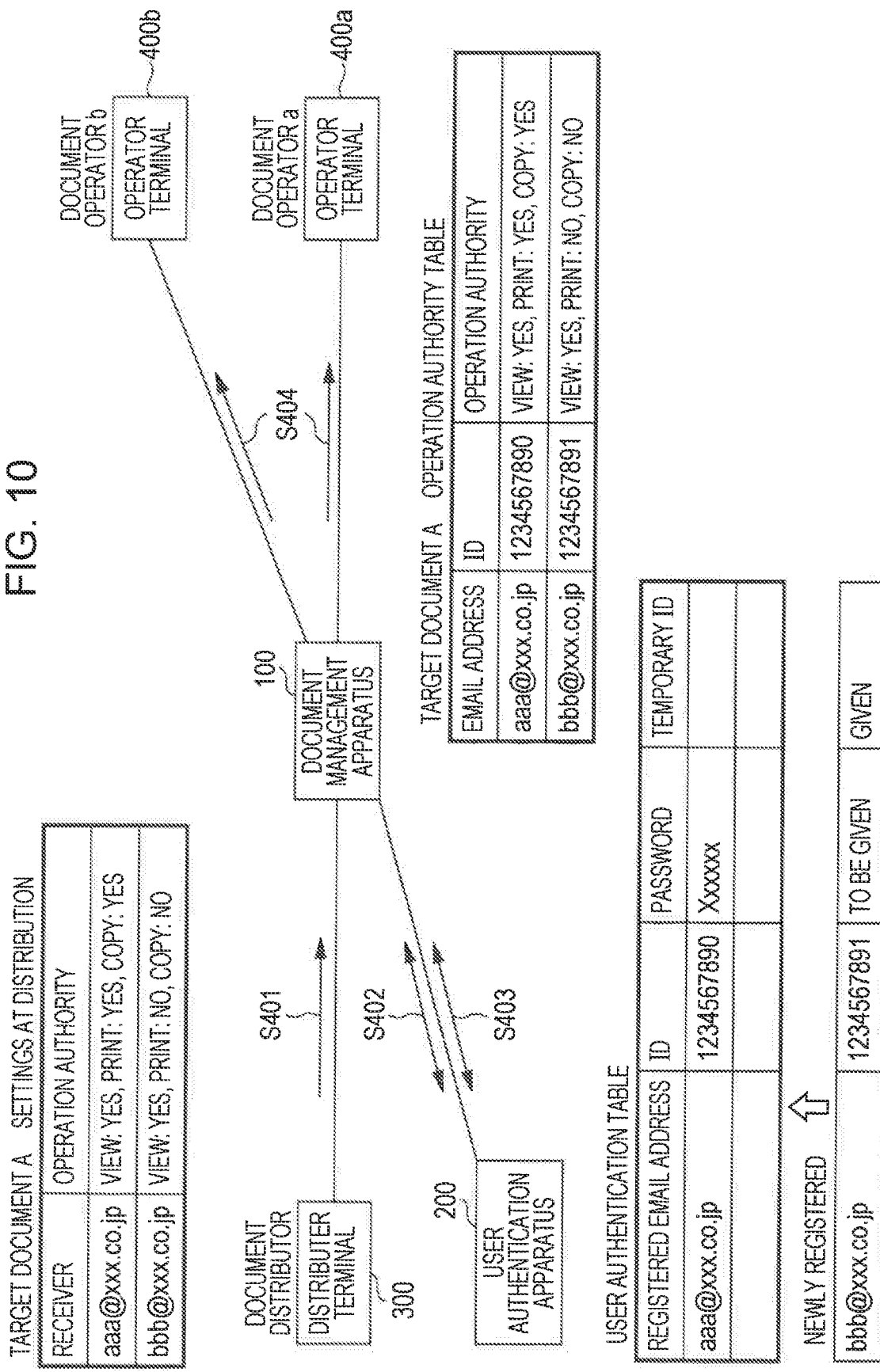

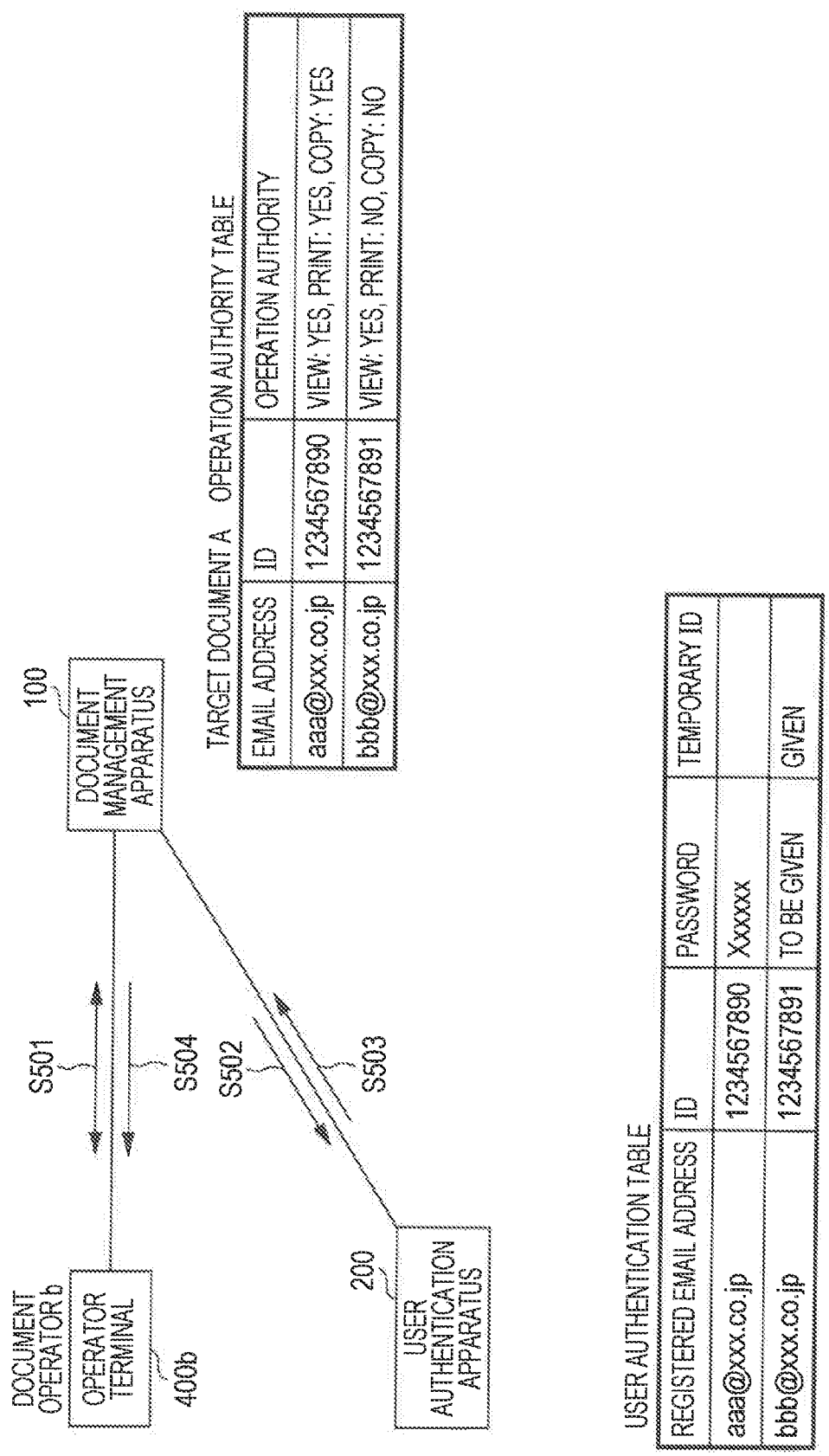

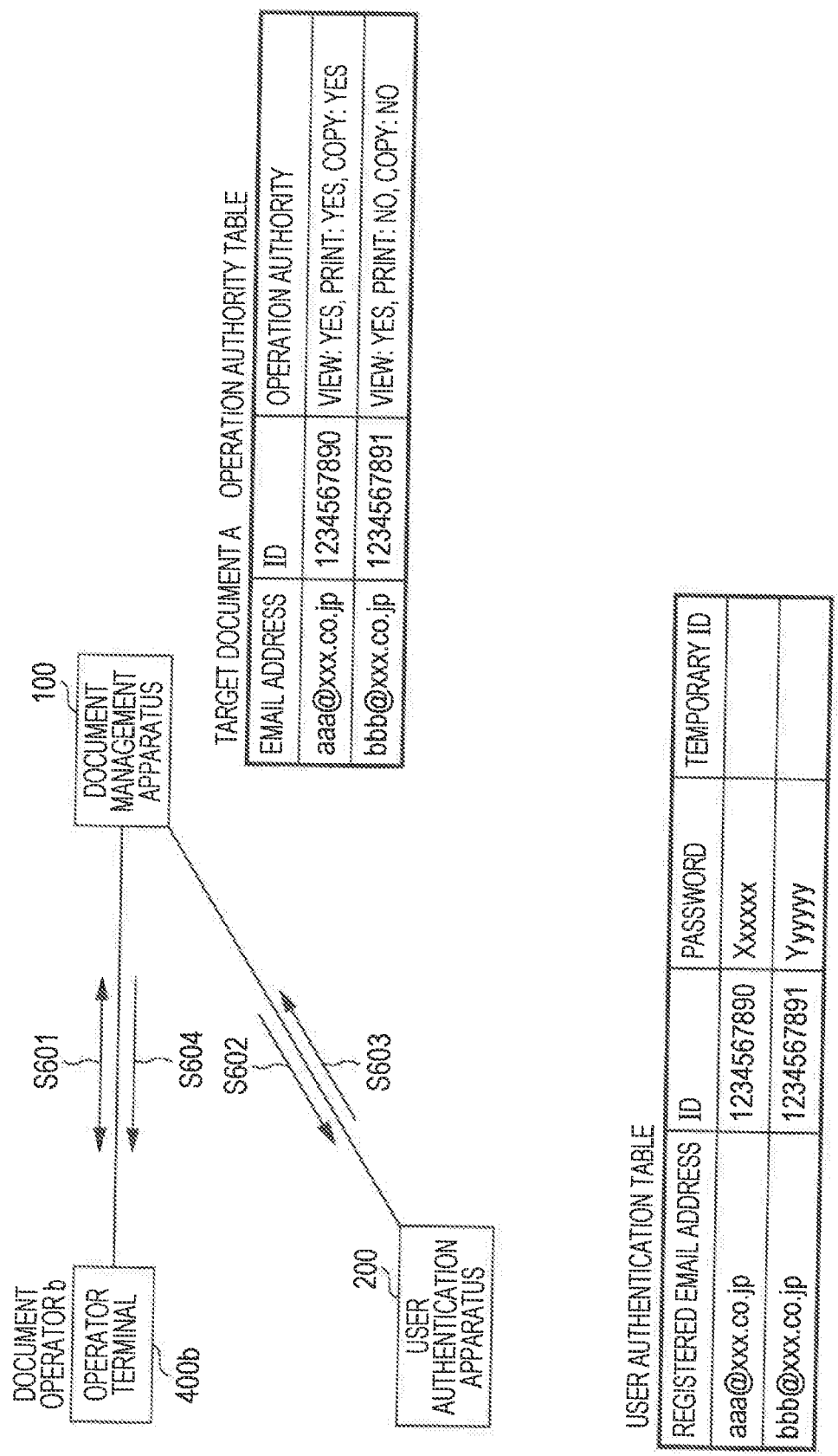

INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-137097 filed Jul. 11, 2016.

BACKGROUND

Technical Field

The present invention relates to an information processing system, an information processing method, and a non-transitory computer readable medium.

Summary

According to an aspect of the invention, there is provided an information processing system that grants an access right to data to a registered user, including a receiving unit and a granting unit. The receiving unit receives information on an unregistered user who is to be granted with an access right to specific data. The granting unit grants the access right to the specific data to the unregistered user after the unregistered user has been registered.

BRIEF DESCRIPTION OF THE DRAWINGS

An exemplary embodiment of the present invention will be described in detail based on the following figures, wherein:

FIG. 6 is a diagram illustrating an example of a screen that is displayed for setting a document operator;

FIG. 8 is a diagram illustrating an example of a screen that is displayed at the time of formal registration;

FIG. 10 is a diagram for describing a specific example of a series of steps performed by the document management system for distributing a document;

FIG. 11 is a diagram for describing a specific example of a series of steps performed by the document management system for operating a document; and FIG. 12 is a diagram for describing a specific example of a series of steps performed by the document management system for operating a document.

DETAILED DESCRIPTION

Hereinafter, an exemplary embodiment of the present invention will be described in detail with reference to the attached drawings.

Overall Configuration of Document Management System

Figure 1:
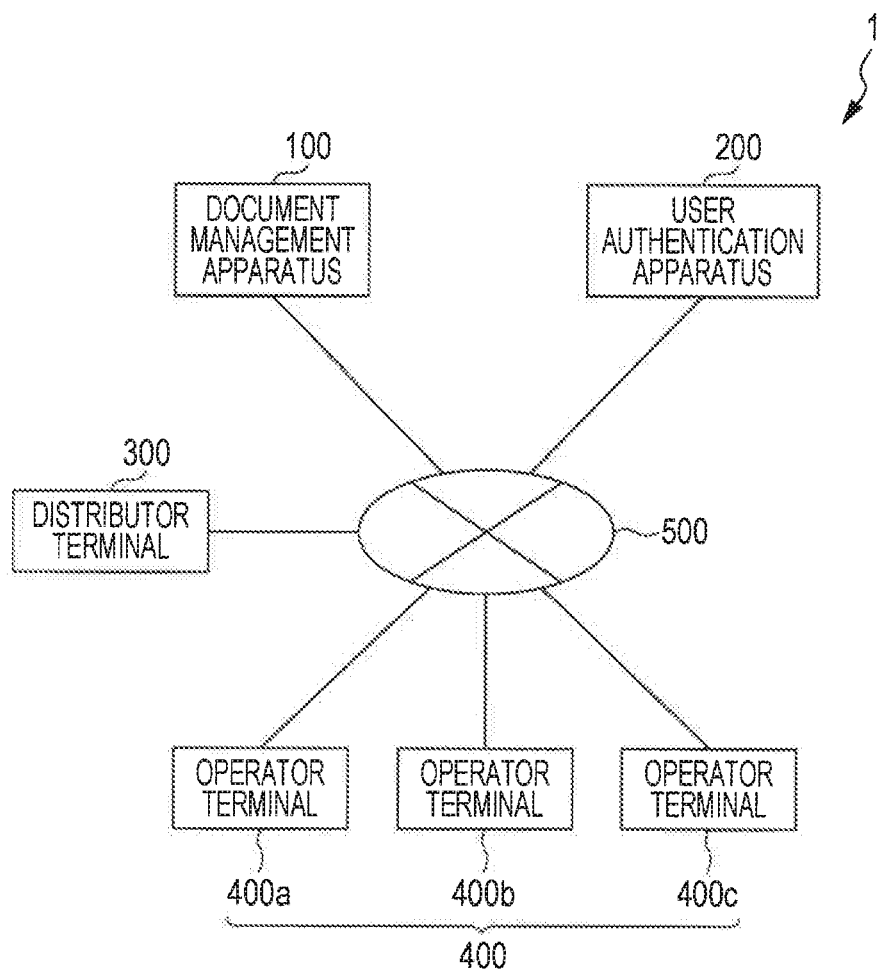
FIG. 1 is a diagram illustrating an example overall configuration of a document management system according to the exemplary embodiment.

First, a description will be given of the overall configuration of a document management system 1 according to the exemplary embodiment. FIG. 1 is a diagram illustrating an example overall configuration of the document management system 1 according to the exemplary embodiment. As illustrated in FIG. 1, the document management system 1 includes a document management apparatus 100, a user authentication apparatus 200, a distributor terminal 300, and operator terminals 400a to 400c, which are connected to each other through a network 500. In the exemplary embodiment, the document management apparatus 100 and the user authentication apparatus 200 are used as an example of an information processing system. The user authentication apparatus 200 is used as an example of an information processing apparatus.

Although only one distributor terminal 300 is illustrated in FIG. 1, two or more distributor terminals 300 may be provided. Each of the operator terminals 400a to 400c will be referred to as an operator terminal 400 when it is not necessary to distinguish them from each other. Although only three operator terminals 400 are illustrated in FIG. 1, four or more operator terminals 400 may be provided.

The document management apparatus 100 is a computer apparatus that manages encrypted documents (encrypted document data). The document management apparatus 100 may be, for example, a personal computer (PC) such as a server apparatus. The document management apparatus 100 distributes an encrypted document to a user who is designated as a distribution destination (hereinafter referred to as a document operator) in response to a request from the distributor terminal 300 operated by a user who distributes the encrypted document (hereinafter referred to as a document distributor). After the encrypted document has been distributed, the document management apparatus 100 executes an operation, such as viewing, printing, or copying, on the distributed encrypted document in response to a request from the operator terminal 400 operated by the document operator. Hereinafter, the document data that is distributed by the document distributor will be referred to as a target document. In the exemplary embodiment, a target document is used as an example of specific data.

The user authentication apparatus 200 is a computer apparatus that performs user authentication. The user authentication apparatus 200 may be, for example, a PC such as a server apparatus. When a document operator requests an operation, such as viewing, on a target document from the operator terminal 400, the user authentication apparatus 200 performs user authentication and determines whether or not to permit the operation by the document operator. More specifically, the user authentication apparatus 200 manages a table in which information indicating permission or non-permission in authentication is registered for each user (hereinafter referred to as a user authentication table), and determines success or failure of authentic with reference to the user authentication table.

In addition, an identification (ID) is registered for each user in the user authentication table. The ID includes a formal ID and a temporary ID. A user who has completed user registration in the user authentication apparatus 200 is given a formal ID. On the other hand, a user who has not completed user registration, that is, a temporarily-registered user (described below), is regarded as a user to be given a formal ID and is given a temporary ID. The user given a temporary ID does not succeed in user authentication. After the user has completed user registration, his/her temporary ID is changed to a formal ID.

As described above, user registration includes "formal registration" and "temporary registration". "Formal registration" means that a user has completed user registration and has been given a formal ID, whereas "temporary registration" means that a user has not completed user registration and has been given a temporary ID, not a formal ID. In the exemplary embodiment, a formal ID is used as an example of an access right.

A document operator is requested to complete formal registration in the user authentication apparatus 200 before performing an operation, such as viewing, on a distributed target document. The document operator is given a formal ID upon completion of formal registration. If a temporary ID has already been given to the document operator, the temporary ID is changed to a formal ID, as described above. In addition, the user authentication apparatus 200 issues a password to be used for authentication to the user upon completion of formal registration.

The distributor terminal 300 is a computer apparatus operated by a document distributor. The distributor terminal 300 may be, for example, a PC or a mobile terminal. The distributor terminal 300 requests the document management apparatus 100 to distribute a target document to a document operator in response to an operation input by the document distributor.

More specifically, in the case of distributing a target document, the document distributor operates the distributor terminal 300 to designate the target document among pieces of document data stored in the document management apparatus 100. At this time, the document distributor designates a document operator as a distribution destination of the target document and sets an operation authority for the document operator. To designate the document operator, an email address of the document operator is used, for example. The operation authority for the document operator indicates, for example, whether to permit viewing of the target document, whether to permit printing of the target document, whether to permit copying of the target document, and the like. After such an operation has been performed by the document distributor, the target document stored in the document management apparatus 100 is distributed to the document operator. In this case, if the document operator has not completed formal registration, the above-described temporary ID is given to the document operator.

Hereinafter, a description will be given under the assumption that an email address of a document operator is used to designate the document operator. However, the exemplary embodiment is not limited thereto, and any information for specifying the document operator, for example, the name or phone number of the document operator, may be used.

The operator terminal 400 is a computer apparatus operated by a document operator. The operator terminal 400 may be, for example, a PC or a mobile terminal. The operator terminal 400 requests an operation, such as viewing, on a distributed target document to the document management apparatus 100 in response to an operation input by the document operator. More specifically, the document operator inputs his/her email address and password, and is permitted to perform an operation such as viewing if authentication by the user authentication apparatus 200 succeeds.

The network 500 is a communication medium used for information communication among individual apparatuses including the document management apparatus 100, the user authentication apparatus 200, the distributor terminal 300, and the operator terminals 400, and is, for example, the Internet, a public line, or a local area network (LAN).

Hardware Configuration of Document Management Apparatus

Figure 2:
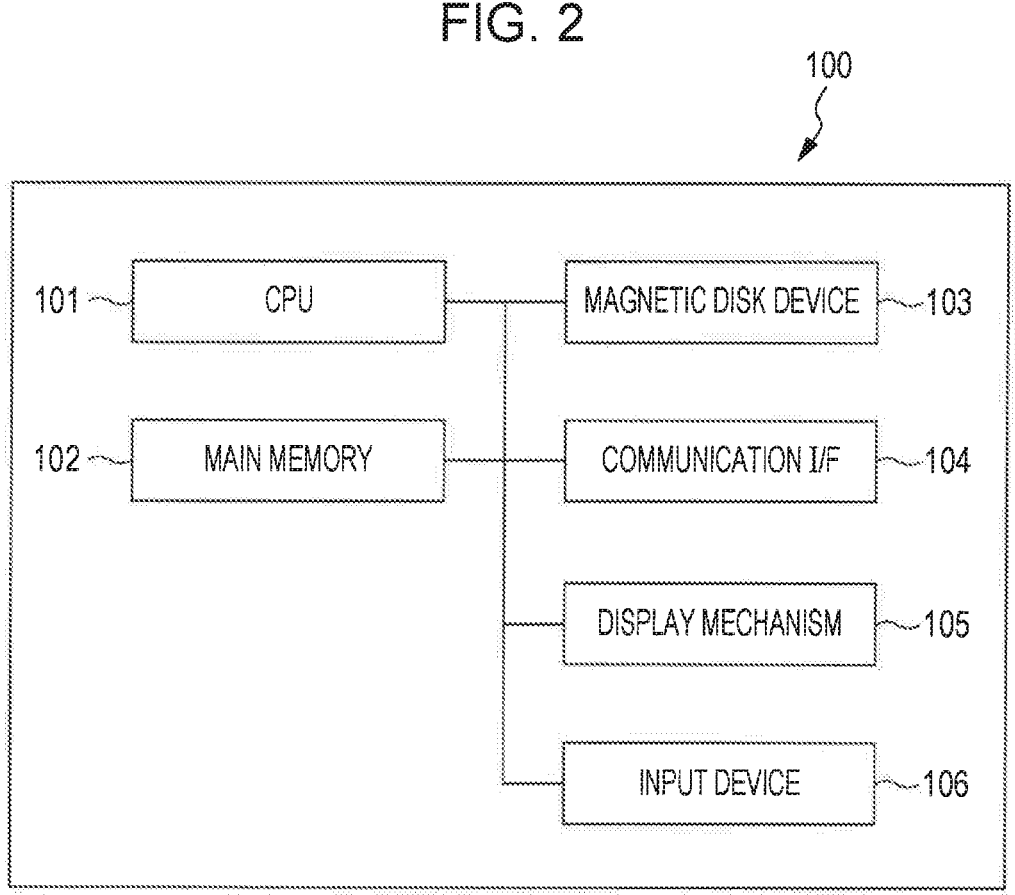
FIG. 2 is a diagram illustrating an example hardware configuration of a document management apparatus according to the exemplary embodiment.

Next, a description will be given of the hardware configuration of the document management apparatus 100 according to the exemplary embodiment. FIG. 2 is a diagram illustrating an example hardware configuration of the document management apparatus 100 according to the exemplary embodiment. As illustrated in FIG. 2, the document management apparatus 100 includes a central processing unit (CPU) 101 serving as an arithmetic unit, a main memory 102 serving as a storage unit, and a magnetic disk device 103.

Here, the CPU 101 executes various programs such as an operating system (OS) and applications, and implements various functions of the document management apparatus 100. The main memory 102 is a storage area that stores various programs and data to be used for executing the programs. The magnetic disk device 103 is a storage area that stores input data to the various programs and output data from the various programs.

The document management apparatus 100 further includes a communication interface (I/F) 104 that communicates with an external apparatus, a display mechanism 105 including a video memory, a display, and the like, and an input device 106 such as a keyboard and a mouse.

The hardware configurations of the user authentication apparatus 200, the distributor terminal 300, and the operator terminals 400 illustrated in FIG. 1 are the same as the hardware configuration of the document management apparatus 100 described above.

Functional Configuration of Document Management Apparatus

Figure 3:
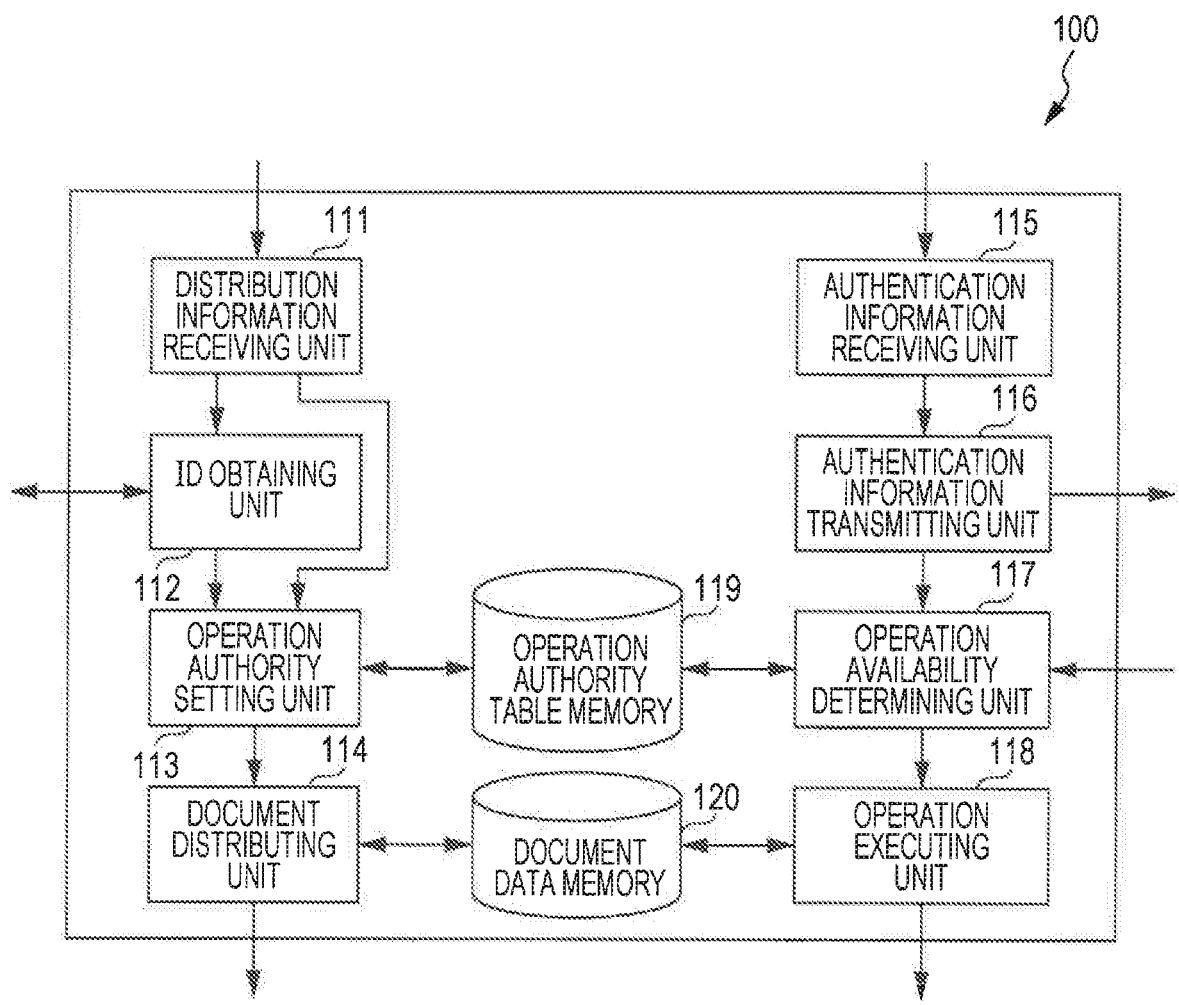
FIG. 3 is a block diagram illustrating an example functional configuration of the document management apparatus according to the exemplary embodiment.

Next, a description will be given of the functional configuration of the document management apparatus 100 according to the exemplary embodiment. FIG. 3 is a block diagram illustrating an example functional configuration of the document management apparatus 100 according to the exemplary embodiment. The document management apparatus 100 includes, as functional units mainly related to distribution of a document, a distribution information receiving unit 111, an ID obtaining unit 112, an operation authority setting unit 113, and a document distributing unit 114. The document management apparatus 100 also includes, as functional units mainly related to an operation of a document, an authentication information receiving unit 115, an authentication information transmitting unit 116, an operation availability determining unit 117, and an operation executing unit 118. The document management apparatus 100 further includes, as functional units mainly related to storage of data, an operation authority table memory 119 and a document data memory 120.

The distribution information receiving unit 111, which is an example of a receiving unit, receives inform n input by a document distributor from the distributor terminal 300 (see FIG. 1) when the document distributor distributes a target document. More specifically, the distribution information receiving unit 111 receives, from the distributor terminal 300, information designating the target document (for example, the name of the target document), an email address of a document operator, and information representing the operation authority of the document operator.

The ID obtaining unit 112 transmits the email address of the document operator that has been received by the distribution information receiving unit 111 to the user authentication apparatus 200 (see FIG. 1), and requests an ID given to the document operator. Also, the ID obtaining unit 112 obtains, as a response to the request, the ID (formal ID or temporary ID) given to the document operator from the user authentication apparatus 200.

The operation authority setting unit 113, which is an example of an operation information setting unit, registers, for each target document, an email address of a document operator, an operation authority of the document operator, and an ID of the document operator obtained from the user authentication apparatus 200 in association with each other. Here, information on an operation authority of each user is registered in a registered table (hereinafter referred to as an operation authority table) for each target document. In addition, for a user who has been given a temporary ID, information on an operation that will be permitted after a formal ID has been given (information on an operation authority) is registered.

After registration by the operation authority setting unit 113 has been completed, the document distributing unit 114 distributes the target document to the operator terminal 400 (see FIG. 1) of the document operator through the network 500 (see FIG. 1), for example, by transmitting the target document by email to the operator terminal 400 of the document operator or making the target document available on the web.

The authentication information receiving unit 115 receives information input by the document operator from the operator terminal 400 when the document operator requests an operation on the target document. More specifically, the authentication information receiving unit 115 receives an email address and password input by the document operator from the operator terminal 400.

The authentication information transmitting unit 116 transmits the email address and password of the document operator that have been received by the authentication information receiving unit 115 to the user authentication apparatus 200, and requests authentication of the document operator.

The operation availability determining unit 117 receives an authentication result from the user authentication apparatus 200 and determines the availability of the operation requested by the document operator. If the operation availability determining unit 117 receives a result indicating that authentication has failed, the operation availability determining unit 117 notifies the operator terminal 400 that authentication has failed. If the operation availability determining unit 117 receives a result indicating that the authentication has succeeded, the operation availability determining unit 117 determines whether or not to permit the operation requested by the document operator with reference to the operation authority table. Here, the operation availability determining unit 117 determines, with reference to the operation authority table, whether or not the document operator is granted with the operation authority to perform the operation requested by the document operator. If the document operator is not granted with the operation authority, the operation availability determining unit 117 notifies the operator terminal 400 that authentication has failed. On the other hand, if the document operator is granted with the operation authority, the operation availability determining unit 117 permits the operation requested by the document operator, and then a process by the operation executing unit 118 is performed.

If the operation requested by the document operator is permitted by the operation availability determining unit 117, the operation executing unit 118 executes a process regarding the permitted operation. For example, if a viewing operation is permitted, the operation executing unit 118 decrypts the target document by using a key (key data) for decrypting the target document and performs control so that the content of the target document is able to be viewed on the operator terminal 400.

The operation authority table memory 119 stores the operation authority table.

The document data memory 120 stores a target document distributed by a document distributor. The document data memory 120 also stores key data or the like that is used to decrypt an encrypted target document.

Functional Configuration of User Authentication Apparatus

Figure 4:
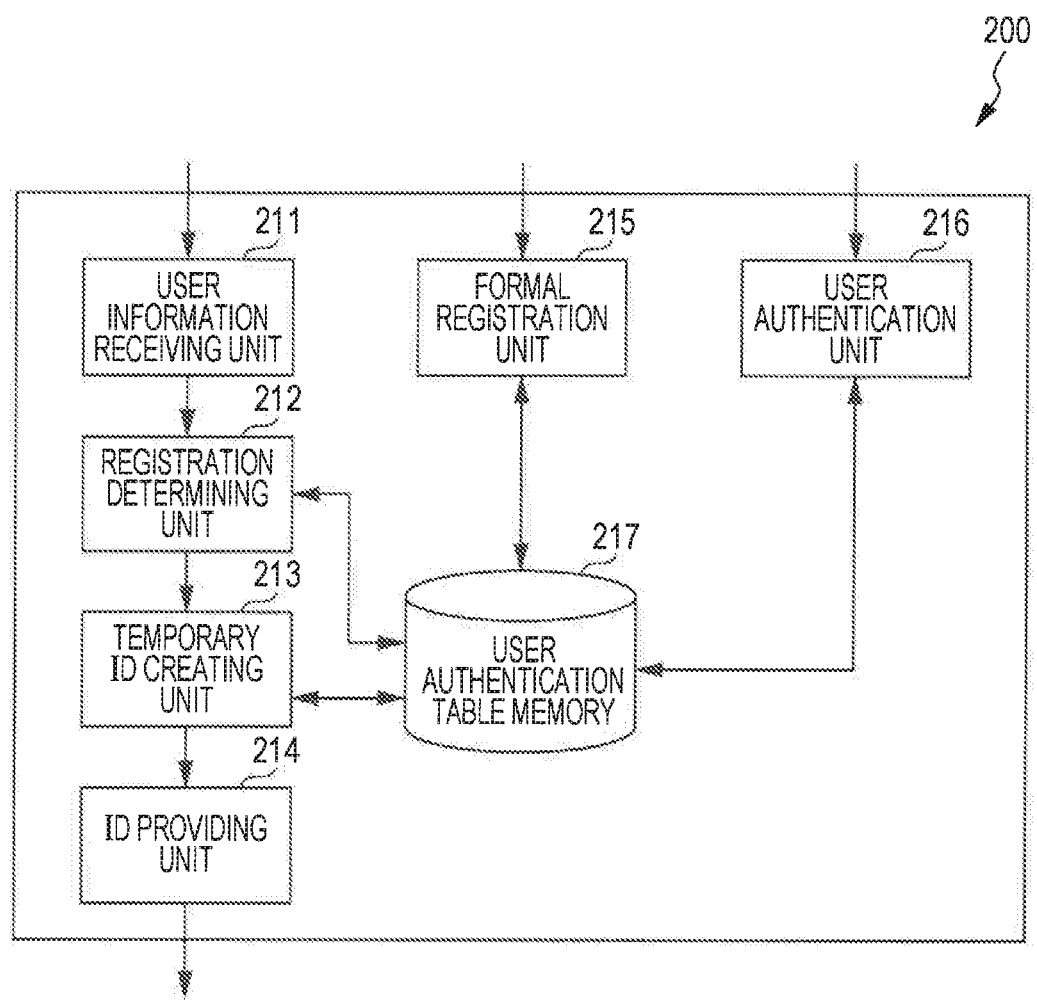
FIG. 4 is a block diagram illustrating an example function configuration of a user authentication apparatus according to the exemplary embodiment.

Next, a description will be given of the functional configuration of the user authentication apparatus 200 according to the exemplary embodiment. FIG. 4 is a block diagram illustrating an example function configuration of the user authentication apparatus 200 according to the exemplary embodiment. The user authentication apparatus 200 includes, as functional units mainly related to distribution of a document, a user information receiving unit 211, a registration determining unit 212, a temporary ID creating unit 213, and an ID providing unit 214. Also, the user authentication apparatus 200 includes, as a functional unit mainly related to user registration, a formal registration unit 215. Furthermore, the user authentication apparatus 200 includes, as a functional unit mainly related to user authentication, a user authentication unit 216. Furthermore, the user authentication apparatus 200 includes a user authentication table memory 217 that stores a user authentication table.

The user information receiving unit 211, which is an example of a receiving unit, receives an email address of a document operator from the ID obtaining unit 112 of the document management apparatus 100 when a document distributor distributes a target document.

The registration determining unit 212 determines, on the basis of the email address received by the user information receiving unit 211, whether or not the document operator has been registered as a user. Here, the registration determining unit 212 determines whether or not the document operator has been registered as a user by referring to the user authentication table on the basis of the received email address of the document operator. In addition, if the document operator has been given a formal ID or temporary ID, the registration determining unit 212 determines that the document operator has been registered as a user. On the other hand, if the document operator has been given neither a formal ID nor temporary ID, the registration determining unit 212 determines that the document operator has not been registered as a user.

If the registration determining unit 212 determines that the document operator has not been registered as a user, the temporary ID creating unit 213 creates a temporary ID. The temporary ID creating unit 213 registers the email address of the document operator and the created temporary ID in association with each other in the user authentication table.

The ID providing unit 214 transmits the ID (formal ID or temporary ID) given to the document operator to the ID obtaining unit 112. If the registration determining unit 212 determines that the document operator has been registered as a user, the document operator has already been given a formal ID or temporary ID, and thus the ID providing unit 214 transmits the formal ID or temporary ID of the document operator to the ID obtaining unit 112 with reference to the user authentication table. On the other hand, if the registration determining unit 212 determines that the document operator has not been registered as a user, the temporary ID creating unit 213 newly creates a temporary ID, and thus the ID providing unit 214 transmits the newly created temporary ID to the ID obtaining unit 112 with reference to the user authentication table.

The formal registration unit 215, which is an example of a granting unit and a registration receiving unit, receives information input by a user from the operator terminal 400 (or the distributor terminal 300) and performs a process of formal registration when the user performs formal registration. Here, various pieces of information such as the name, address, name of work site, and phone number of the user are input in addition to the email address of the user. If the user has not been registers the formal registration unit 215 gives the user a formal ID and completes formal registration. At this time, the formal registration unit 215 newly issues a password and notifies the operator terminal 400 of the password. If the user has been given a temporary ID and is in a temporarily registered state, the formal registration unit 215 performs a process of changing the temporary ID to a formal ID and completes formal registration. Also in this case, the formal registration unit 215 newly issues a password and notifies the operator terminal 400 of the password. The various pieces of information input by the user are registered in the user authentication table in association with the formal ID.

When the document operator performs an operation on a target document, the user authentication unit 216 receives the email address and password of the document operator from the authentication information transmitting unit 116 of the document management apparatus 100. Here, the user authentication unit 216 determines whether or not the document operator has been given a formal ID with reference to the user authentication table on the basis of the email address of the document operator. If the document operator has been given a formal ID, the user authentication unit 216 performs authentication using the password and determines whether or not authentication succeeds. On the other hand, if the document operator has been given a temporary ID or if the document operator has been given neither a formal ID nor temporary ID, the user authentication unit 216 does not perform authentication using the password and determines that authentication fails. The authentication result is transmitted from the user authentication unit 216 to the operation availability determining unit 117 of the document management apparatus 100.

The user authentication table memory 217 stores the user authentication table.

Operation of Entire Management System for Distributing Document

Figure 5:
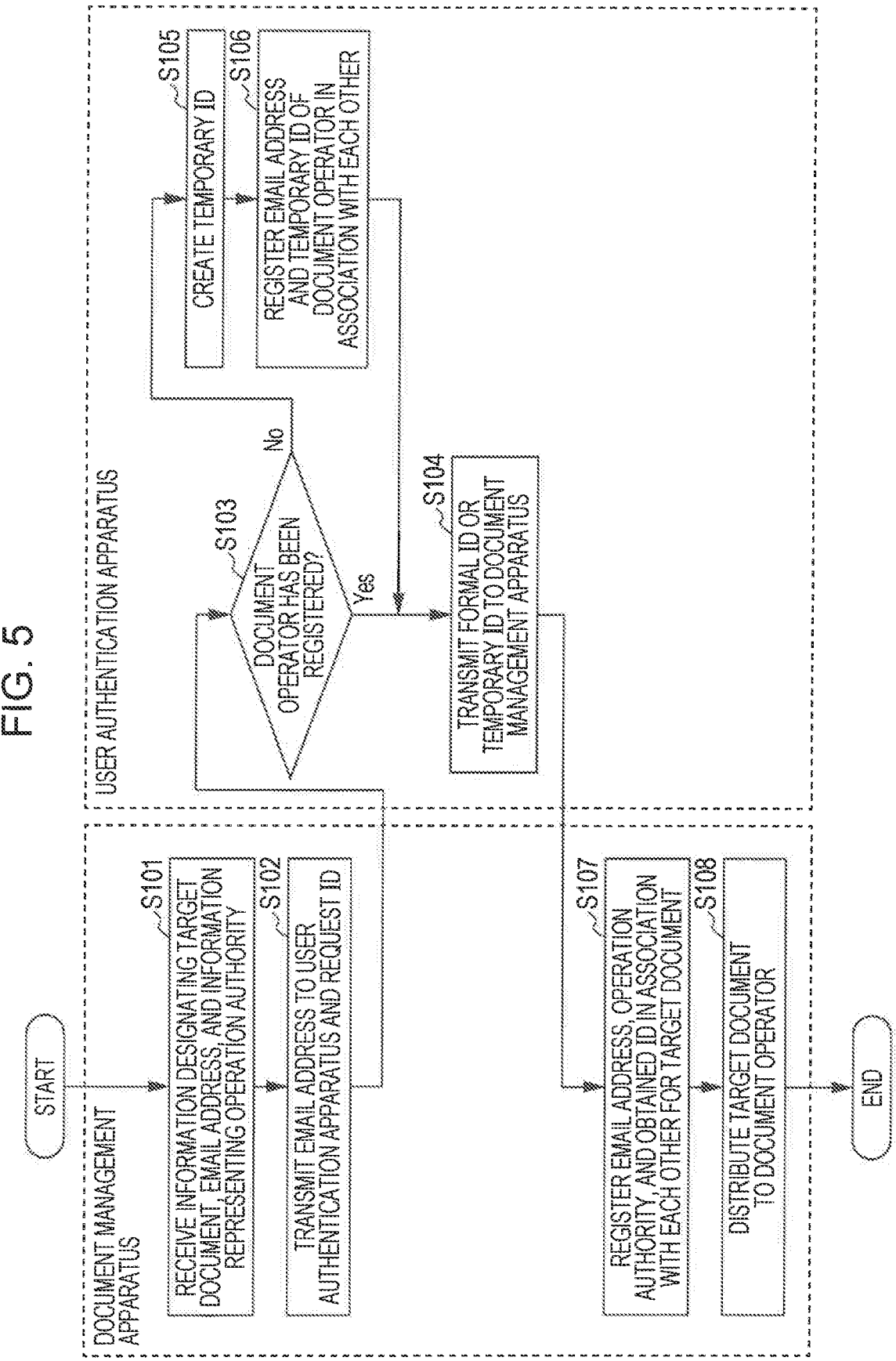
FIG. 5 is a flowchart illustrating an example of a series of steps of a process performed by the document management system for distributing a document.

Next, a description will be given of the operation of the entire document management system 1 in a case where a document distributor distributes a target document. FIG. 5 is a flowchart illustrating an example of a series of steps of a process performed by the document management system 1 for distributing a document. The process illustrated in FIG. 5 includes, as indicated by broken-line frames, the process performed by the document management apparatus 100 and the process performed by the user authentication apparatus 200. Specifically, steps S101, S102, S107, and S108 are performed by the document management apparatus 100, whereas steps S103 to S106 are performed by the user authentication apparatus 200.

In the case of distributing a target document, the document distributor operates the distributor terminal 300 to designate the target document among pieces of document data held in the document management apparatus 100 and set a document operator and an operation authority to be granted to the document operator, as described above. In accordance with the operation by the document distributor, the distribution information receiving unit 111 of the document management apparatus 100 receives information designating the target document (for ample, the name of the target document), an email address of the document operator, and information representing the operation authority of the document operator (step S101).

Figure 6:
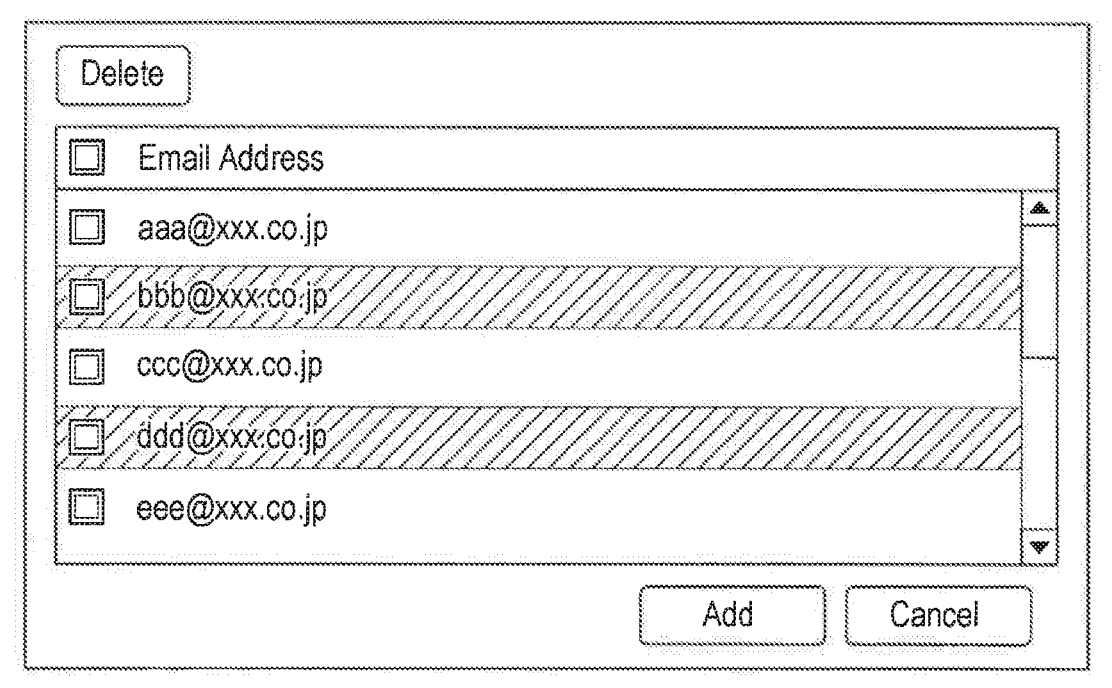

FIG. 6 is a diagram illustrating an example of a screen that is displayed for setting a document operator. This screen is displayed on the distributor terminal 300. In the example illustrated in FIG. 6, the users registered in an address list held in the distributor terminal 300 of the document distributor are displayed as candidate document operators. Here, the users may be displayed such that a user who has been given a formal ID, a user who has been given a temporary ID, and a user who has been given neither a formal ID nor temporary ID are distinguished from each other. In the example illustrated in FIG. 6, the email addresses "bbb@xxx.co.jp" and "ddd@xxx.co.jp" of users who have been given a temporary ID are colored. This indicates that the users to whom a target document has previously been distributed have not yet completed formal registration.

Subsequently, the ID obtaining unit 112 of the document management apparatus 100 transmits the received email address of the document operator to the user information receiving unit 211 of the user authentication apparatus 200 and requests an ID given to the document operator (step S102). Subsequently, the user information receiving unit 211 of the user authentication apparatus 200 receives the email address, and then the registration determining unit 212 of the user authentication apparatus 200 determines, on the basis of the received email address, whether or not the document operator has been registered as a user (step S103). If the document operator has been given a formal ID or temporary ID, the registration determining unit 212 determines that the document operator has been registered as a user.

If it is determined that the document operator has been registered as a user (YES in step S103), the ID providing unit 214 of the user authentication apparatus 200 transmits the formal ID or temporary ID of the document operator to the ID obtaining unit 112 of the document management apparatus 100 (step S104). On the other hand, if it is determined that the document operator has not been registered as a user, that is, if neither a formal ID nor temporary ID has been registered (NO in step S103), the temporary ID creating unit 213 of the user authentication apparatus 200 creates a temporary ID to be given to the document operator (step 105). Subsequently, the temporary ID creating unit 213 registers, in the user authentication table, the email address of the document operator and the newly created temporary ID in association with each other (step S106). Subsequently, the process proceeds to step S104. In step S104, the ID providing unit 214 transmits the newly created temporary ID to the ID obtaining unit 112.

After the ID obtaining unit 112 obtains the ID (formal ID or temporary ID) provided by the ID providing unit 214, the operation authority setting unit 113 registers, in the operation authority table, the email address of the document operator, the operation authority of the document opera and the obtained ID of the document operator for the target document in association with each other (step S107). Subsequently, the document distributing unit 114 distributes the target document to the document operator through the network 500 (step S108). The target document is encrypted, and thus an operation such as viewing is not executed thereon unless the document operator is authenticated by the user authentication apparatus 200. After that, the process ends.

In this way, with an operation by a document distributor, a temporary ID is issued to a document operator who has not completed formal registration. Thus, the document distributor may set an operation authority by designating a document operator without being conscious of whether or not the document operator as a distribution destination of a target document has completed formal registration. The document management apparatus 100 may perform the process of distributing a document without managing whether or not the ID received from the user authentication apparatus 200 is a formal ID or temporary ID.

Formal Registration Process

Figure 7:
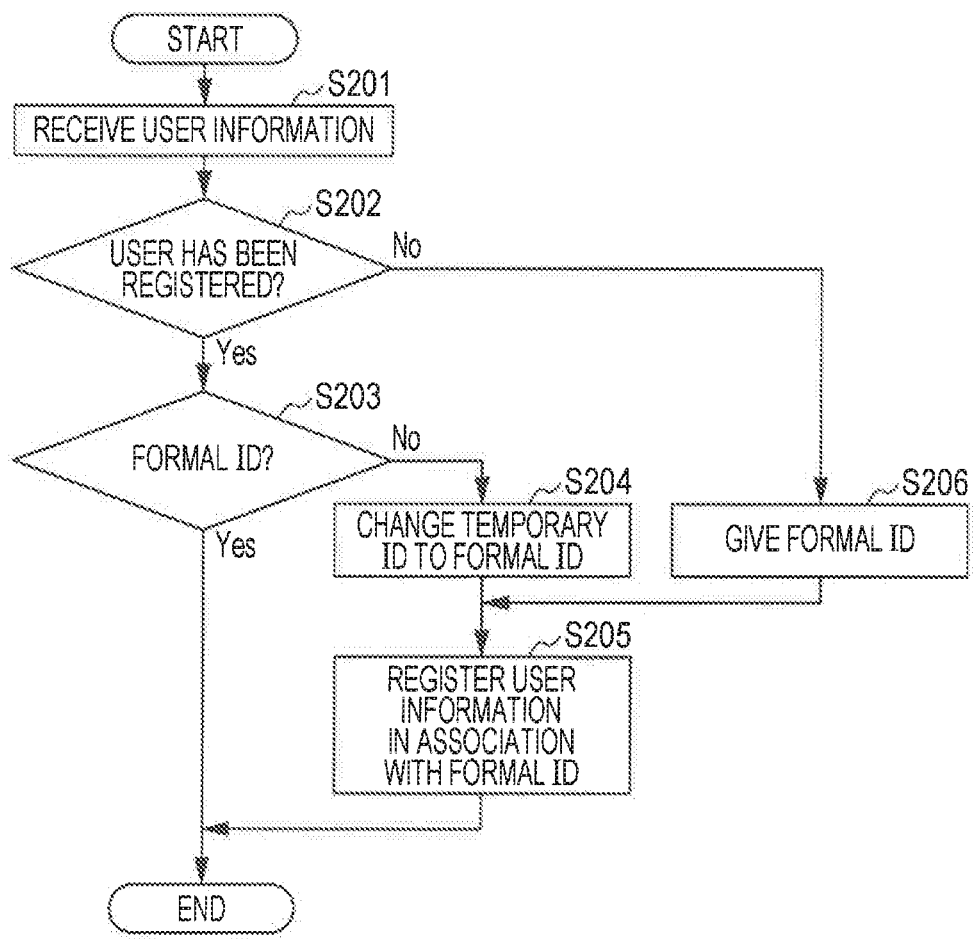
FIG. 7 is a flowchart illustrating an example of a series of steps of a process performed by the user authentication apparatus in formal registration.

Next, a description will be given of a process when a user performs formal registration. FIG. 7 is a flowchart illustrating an example of a series of steps of a process performed by the user authentication apparatus 200 in formal registration.

At the time of performing formal registration, the user accesses the user authentication apparatus 200 from the operator terminal 400 (or the distributor terminal 300) and inputs various pieces of information including his/her email address. In accordance with the user operation, the formal registration unit 215 of the user authentication apparatus 200 receives the information on the user that has been input (step S201). Subsequently, the formal registration unit 215 determines whether or not the user has been registered (step S202). Here, the formal registration unit 215 refers to the user authentication table, and determines that the user has been registered if the input email address of the user has been registered therein.

If it is determined that the user has been registered (YES in step S202), the formal registration unit 215 determines, in the user authentication table, whether or not the ID of the user is a formal ID (step S203). If it is determined that the ID is a formal. ID (YES in step S203), it is not necessary to register the user, and thus the formal registration unit 215 notifies the operator terminal 400 operated by the user that the user has been registered. After that, the process ends.

If it is determined in step S203 that the ID is not a formal ID (NO in step S203), the ID is a temporary ID, and thus the formal registration unit 215 performs a process of changing the temporary ID to a formal ID (step S204). Also, the formal registration unit 215 registers, in the user authentication table, the various pieces of information on the user that have been input in association with the formal ID (step S205). Here, the formal registration unit 215 issues a password to be used for authentication and registers the password in the user authentication table. In this case, the formal registration unit 215 notifies the operator terminal 400 that the formal registration has been completed and also notifies the operator terminal 400 of the issued password. After that, the process ends.

If it is determined in step S202 that the user has not been registered (NO in step S202), the user is a new user, and neither a formal ID nor temporary ID has been given, and thus the formal registration unit 215 gives a formal ID to the user (step S206). Subsequently, the process proceeds to step S205. Here, the formal registration unit 215 issues a password to be used for authentication and registers the password in the user authentication table. In this case, the formal registration unit 215 notifies the operator terminal 400 that the formal registration has been completed and also notifies the operator terminal 400 of the issued password. After that, the process ends.

FIG. 8 is a diagram illustrating an example of a screen that is displayed at the time of formal registration. This screen is displayed when the user accesses the user authentication apparatus 200 from the operator terminal 400 (or the distributor terminal 300) to perform formal registration. Here, various items to be input are determined: name of user, name of work site, address of work site, phone number, email address, and so forth.

For example, when a user who has been given a temporary ID performs formal registration, if information of predetermined items is not input (that is, if information of a predetermined range is not input), formal registration may not be completed. Alternatively, if information of the predetermined items is not input, formal registration may not be completed, and in this case, the user may be permitted to perform a viewing operation or the like once, but completion of formal registration may be necessary to perform a viewing operation next time. The predetermined items are those necessary to complete formal registration, for example, personal information on the user such as "email address", "name", and "phone number".

Furthermore, for example, in a case where a document distributor designates a document operator, the document distributor may input information on the document operator such as the name of the document operator in advance, formal registration may be completed if the information input by the document operator at the time of formal registration matches the information input by the document distributor in advance, and formal registration may not be completed if the pieces of information do not match and the document operator is determined to be unauthorized.

Alternatively, for example, in a case where a document distributor designates a trusted person as a document operator, the document distributor may input information on the document operator such as the name of the document operator in advance, and the document operator may use the information input by the document distributor in advance when performing formal registration, so as to save the effort of the document operator to input information.

Operation of Entire Management System for Operating Document

Figure 9:
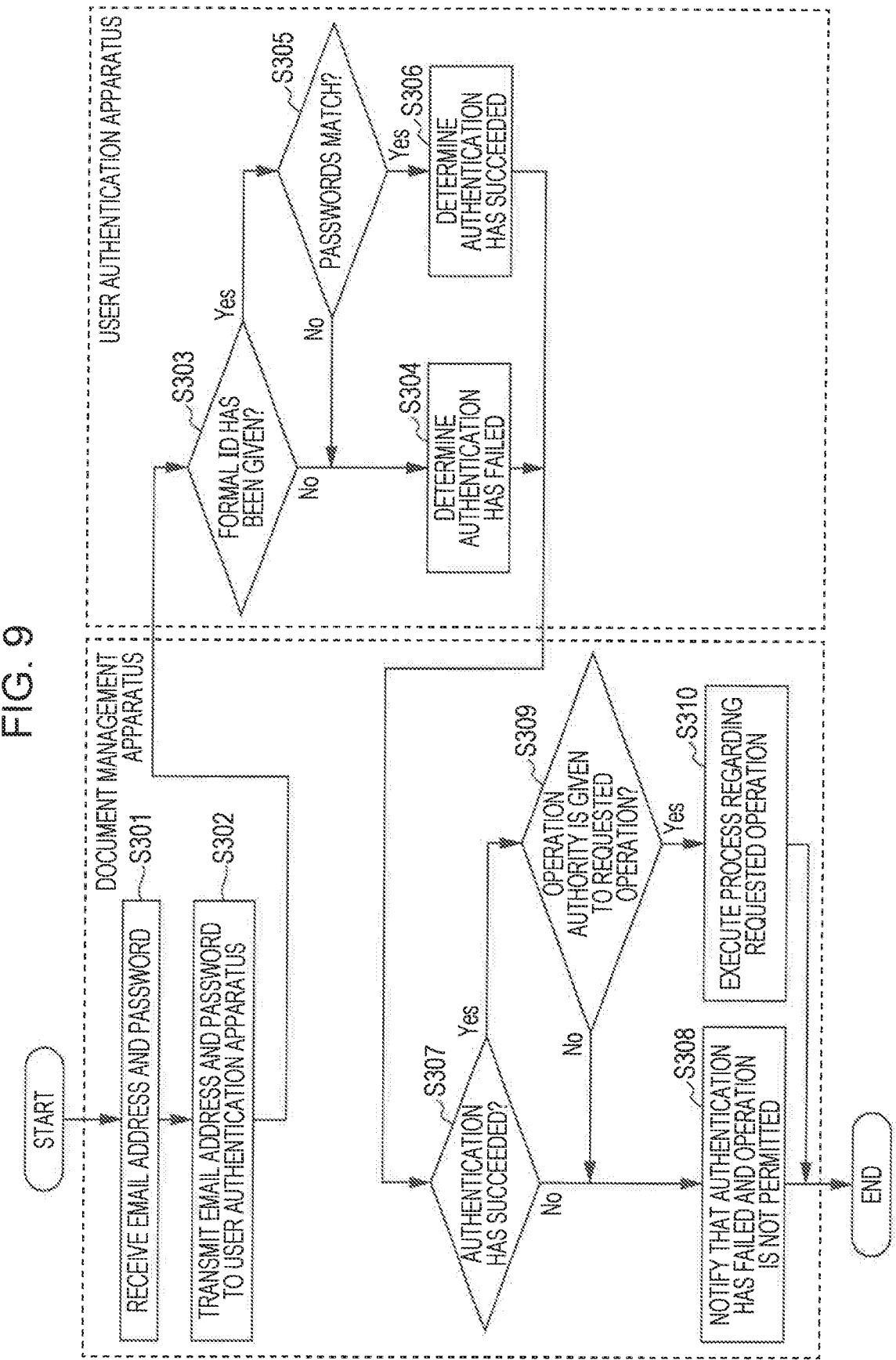
FIG. 9 is a flowchart illustrating an example of a series of steps of a process performed by the document management system for operating a document.

Next, a description will be given of the operation of the entire document management system 1 in a case where a document operator performs an operation on a target document. FIG. 9 is a flowchart illustrating an example of a series of steps of a process performed by the document management system 1 for operating a document. The process illustrated in FIG. 9 includes, as indicated by broken-line frames, the process performed by the document management apparatus 100 and the process performed by the user authentication apparatus 200. Specifically, steps S301, S302, and S307 to S310 are performed by the document management apparatus 100, whereas steps S303 to S306 are performed by the user authentication apparatus 200.

In the case of performing an operation on a target document, a document operator operates the operator terminal 400 to request an operation such as viewing of a distributed document, as described above. Subsequently, the document management apparatus 100 requests the document operator to input his/her email address and password. After the document operator inputs the email address and password, the authentication information receiving unit 115 of the document management apparatus 100 receives the input email address and password (step S301). Here, if the document operator has completed formal registration, a password has been issued and thus the document operator may input the issued password. On the other hand, if the document operator has not completed formal registration, a password has not been issued and thus the document operator may input a certain password.

Subsequently, the authentication information transmitting unit 116 transmits the input email address and password to the user authentication unit 216 of the user authentication apparatus 200 (step S302). Subsequently, the user authentication unit 216 of the user authentication apparatus 200 receives the email address and password of the document operator and then determines, on the basis of the email address of the document operator, whether or not a formal ID has been given to the document operator (step S303). Specifically, the user authentication unit 216 determines whether or not the email address of the document operator has been registered and determines whether or not a formal ID has been registered as the ID of the document operator, with reference to the user authentication table.

If it is determined that a formal ID has not been given (NO in step S303), in other words, if a temporary ID has been given to the document operator or if neither a temporary ID nor formal ID has been given to the document operator, the user authentication unit 216 determines that authentication has failed (step S304). Here, it is determined that authentication has failed without authentication using a password. Also, the user authentication unit 216 notifies the operation availability determining unit 117 of the document management apparatus 100 that authentication has failed. Subsequently, the process proceeds to step S307, which will be described below.

If it is determined in step S303 that a formal ID has been given (YES in step S303), the user authentication unit 216 compares the password input by the document operator with the password registered in the user authentication table in association with the formal ID and determines whether or not both the passwords match (step S305). If it is determined that both the passwords do not match (NO in step S305), the process proceeds to step S304. If it is determined that both the passwords match (YES in step S305), the user authentication unit 216 determines that authentication has succeeded (step S306). Here, the user authentication unit 216 notifies the operation availability determining unit 117 of the document management apparatus 100 that authentication has succeeded.

After step S304 or S306, the operation availability determining unit 117 of the document management apparatus 100 determines, on the basis of the authentication result received from the user authentication unit 216, whether or not authentication has succeeded (step S307). If authentication has failed (NO in step S307), the operation availability determining unit 117 notifies the operator terminal 400 that authentication has failed and the operation is not permitted (step S308). After that, the process ends.

If authentication has succeeded (YES in step S307), the operation availability determining unit 117 checks the operation authority of the document operator with reference to the operation authority table. Subsequently, the operation availability determining unit 117 determines whether or not an operation authority has been granted for the operation requested by the document operator (step S309). If it is determined that an operation authority has not been granted (NO in step S309), the process proceeds to step S308. If it is determined that an operation authority has been granted (YES in step S309), the operation executing unit 118 executes a process regarding the operation requested by the document operator (step S310). After that, the process ends.

As described above, if a temporary ID has been given to the document operator or if neither a temporary ID nor formal ID has been given to the document operator, authentication using a password is not performed and authentication fails. On the other hand, if the document operator has completed formal registration and has been given a formal ID, authentication using a password is performed. If authentication by the user authentication apparatus 200 succeeds, the operation availability to the document operator is determined on the basis of the operation authority set by the document distributor. The document management apparatus 100 may perform the process of operating a document without managing whether the ID given to the document operator is a formal ID or temporary ID.

If a document operator who has been given a temporary ID requests an operation to be performed on a target document while remaining unregistered, the document management apparatus 100 may control the operator terminal 400 to display a notice prompting formal registration. In this case, for example, the user authentication unit 216 of the user authentication apparatus 200 determines, in step S303, whether or not a temporary ID has been given in addition to whether or not a formal ID has been given. If it is determined that a temporary ID has been given, the user authentication unit 216 notifies the operation availability determining unit 117 of the document management apparatus 100 that authentication has failed and that a temporary ID has been given in step S304. If it is determined in step S307 that authentication has failed, the operation availability determining unit 117 determines whether or not a notification indicating that a temporary ID has been given has been received. If the notification has been received, the operation availability determining unit 117 notifies the operator terminal 400 that authentication has failed and controls the operator terminal 400 to display a notice prompting formal registration in step S308. In this case, the operation availability determining unit 117 of the document management apparatus 100 may be regarded as an example of a display controller. Also, the user authentication unit 216 of the user authentication apparatus 200 may be regarded as an example of a display controller.

Specific Example of Process of Distributing Document

Next, a description will be given of, with a specific example, the operation of the entire document management system 1 in a case where a document distributor distributes a target document. FIG. 10 is a diagram for describing a specific example of a series of steps performed by the document management system 1 for distributing a document. In the example illustrated in FIG. 10, it is assumed that a document distributor distributes a target document A to a document operator "a" who operates the operator terminal 400*a* and a document operator "b" who operates the operator terminal 400*b*.

The document operator "a" has completed formal registration in the user authentication apparatus 200 and has been given a formal ID. On the other hand, the document operator "b" has not been registered in the user authentication apparatus 200 and has been given neither a formal ID nor temporary ID. That is, in the user authentication table illustrated in FIG. 10, an email address "aaa@xxx.co.jp" of the document operator "a" has been registered, and the email address is associated with a formal ID "1234567890". Also, a password "Xxxxxx" has been issued. On the other hand, an email address "bbb@xxx.co.jp" of the document operator "b" has not been registered.

First, in step S401, the document distributor operates the distributor terminal 300 to designate the target document A among pieces of document data held in the document management apparatus 100. Also, the document distributor designates, as document operators to whom the target document A is to be distributed, the email addresses of the document operators "a" and "b" and sets the operation authorities of the document operators "a" and "b". Here, the document distributor may designate the users to whom the target document A is to be distributed without being conscious of whether or not the document operators "a" and "b" have been registered as users in the user authentication apparatus 200.

As illustrated in FIG. 10, the email address "aaa@xxx.co.jp" of the document operator "a" and the email address "bbb@xxx.co.jp" of the document operator "b" are designated as a setting at the time of distribution. Also, as the operation authority of the document operator "a", "view: yes, print: yes, copy: yes" is set, in other words, the permission to view, print, and copy the target document A is set. Also, as the operation authority of the document operator "b", "view: yes, print: no, copy: no" is set, in other words, the permission to view the target document A and the non-permission to print or copy the target document A are set.

Subsequently, upon receipt of the email addresses of the document operators "a" and "b", the document management apparatus 100 transmits the email addresses to the user authentication apparatus 200. Subsequently, the document management apparatus 100 obtains the IDs of the document operators "a" and "b" from the user authentication apparatus 200. Here, the process of obtaining the ID of the document operator "a" is described as step S402, and the process of obtaining the ID of the document operator "b" is described as step S403.

In step S402, the document management apparatus 100 transmits the email address of the document operator "a" to the user authentication apparatus 200. The user authentication apparatus 200 determines, on the basis of the received email address, whether or not the document operator "a" has been registered as a user. In the example illustrated in FIG. 10, the document operator "a" has completed formal registration, and thus the user authentication apparatus 200 obtains the formal ID "1234567890" of the document operator "a" with reference to the user authentication table and transmits the formal ID "1234567890" to the document management apparatus 100. The document management apparatus 100 obtains the formal ID "1234567890" of the document operator "a" provided by the user authentication apparatus 200.

In step S403, the document management apparatus 100 transmits the email address of the document operator "b" to the user authentication apparatus 200. The user authentication apparatus 200 determines, on the basis of the received email address, whether or not the document operator "b" has been registered as a user. In the example illustrated in FIG. 10, the document operator "b" has not been registered, and thus the user authentication apparatus 200 newly creates a temporary ID "1234567891" and transmits the temporary ID to the document management apparatus 100. The email address "bbb@xxx.co.jp" and the temporary ID "1234567891" of the document operator "b" are registered in the user authentication table in association with each other. However, since only the temporary ID has been created, no password is issued. The document management apparatus 100 obtains the temporary ID "1234567891" of the document operator "b" provided by the user authentication apparatus 200.

Subsequently, in step S404, the document management apparatus 100 registers, for the target document A, the email address of the document operator "a", the operation authority of the document operator "a", and the obtained formal ID of the document operator "a" in association with each other as in the operation authority table illustrated in FIG. 10. Also, the document management apparatus 100 registers, for the target document A, the email address of the document operator "b", the operation authority of the document operator "b", and the obtained temporary ID of the document operator "b" in association with each other. Subsequently, the document management apparatus 100 distributes the target document A to the document operators "a" and "b" through the network 500.

Specific Examples of Process of Operating Document

Next, a description will be given of, with specific examples, the operation of the entire document management system 1 in a case where a document operator performs an operation on a target document. FIGS. 11 and 12 are diagrams, for describing specific examples of a series of steps performed by the document management system 1 for operating a document. In the example illustrated in FIG. 11, a description will be given of a process in a case where the document operator "b" in FIG. 10 views the target document A. In the example illustrated in FIG. 12, a description will be given of a process in a case where the document operator "b" in FIG. 10 views the target document A after completing formal registration.

First, a description will be given of the process illustrated in FIG. 11.

In step S501, the document operator "b" operates the operator terminal 400b to request viewing of the distributed target document A. Subsequently, the document operator "b" is requested to input an email address and a password from the document management apparatus 100, and then inputs the email address "bbb@xxx.co.jp" and a password.

Subsequently, in step S502, the document management apparatus 100 transmits the email address and password input by the document operator "b" to the user authentication apparatus 200 and requests authentication of the document operator "b".

Subsequently, in step S503, the user authentication apparatus 200 determines, on the basis of the email address "bbb@xxx.co.jp" received from the document management apparatus 100, whether or not the document operator "b" has been given a formal ID. As illustrated in the user authentication table in FIG. 11, the document operator "b" has been given a temporary ID. Thus, the user authentication apparatus 200 determines that authentication has failed without performing authentication using a password, and notifies the document management apparatus 100 of the authentication result.

Subsequently, in step S504, the document management apparatus 100 notifies the operator terminal 400b that authentication has failed and viewing is not permitted.

In this way, if the document operator has been given a temporary ID, authentication in the user authentication apparatus 200 fails and thus the operation by the document operator is not permitted regardless of the operation authority set by the document distributor.

Next, a description will be given of the process illustrated in FIG. 12. Here, it is assumed that the document operator "b" has completed formal registration and that the temporary ID of the document operator "b" has been changed to a formal ID, as illustrated in the user authentication table in FIG. 12. Also, a password "Yyyyyy" has been issued to the document operator "b" in accordance with the completion of formal registration.

In step S601, the document operator "b" operates the operator terminal 400b to request viewing of the distributed target document A. Subsequently, the document operator "b" inputs the email address "bbb@xxx.co.jp" and the password "Yyyyyy".

Subsequently, in step S602, the document management apparatus 100 transmits the email address and password input by the document operator "b" to the user authentication apparatus 200 and requests authentication of the document operator "b".

Subsequently, in step S603, the user authentication apparatus 200 determines, on the basis of the email address "bbb.xxx.co.jp" received from the document management apparatus 100, whether or not the document operator "b" has been given a formal ID. As illustrated in the user authentication table in FIG. 12, the document operator "b" has been given a formal ID. Thus, the user authentication apparatus 200 performs authentication using the password. That is, the user authentication apparatus 200 compares the password registered in the user authentication table with the password received from the document management apparatus 100 and determines whether or not both the passwords match. In the example illustrated in FIG. 12, the passwords match, and thus the user authentication apparatus 200 determines that authentication has succeeded and notifies the document management apparatus 100 of the authentication result.

Subsequently, in step S604, the document management apparatus 100 determines that authentication has succeeded and then checks the operation authority of the document operator "b" regarding the target document A with reference to the operation authority table. As illustrated in the operation authority table in FIG. 12, the document operator "b" has been granted with the authority to view the target document A. Thus, the document management apparatus 100 decrypts the target document A so that the document operator "b" is able to view the content of the target document A.

As described above, in the exemplary embodiment, a document distributor may designate a document operator to whom a target document is to be distributed without being conscious of whether or not the document operator has been registered. In the case of distributing the target document to an unregistered user, the document distributor may set an operation authority to the unregistered user by giving a temporary ID to the user. If the user given the temporary ID has completed formal registration, the operation authority has already been set and thus it is not necessary to newly set an operation authority in accordance with the change from the temporary ID to a formal ID. Furthermore, a user who has been given a temporary ID does not succeed in authentication unless the user completes formal registration and becomes capable of performing an operation on the target document after completing formal registration.

In the exemplary embodiment, the formal registration unit 215 of the user authentication apparatus 200 may delete information, such as a temporary ID, of a document operator from the user authentication table, if the document operator does not complete formal registration within a predetermined period after the user information receiving unit 211 receives the email address of the document operator (or after a temporary ID has been created for the document operator). The predetermined period may be, for example, a period over which the target document is publicly available. With such a configuration of the user authentication apparatus 200, an unnecessary ID may be deleted and unauthorized access to the target document may be suppressed, in this case, the formal registration unit 215 may be regarded as an example of a canceling unit.

In the exemplary embodiment, the document management apparatus 100 distributes a target document in an encrypted state to a document operator in response to a request for distributing the document from a document distributor. In response to a request for operating the target document from the document operator, the document management apparatus 100 decrypts the target document and executes a process such as viewing. With such a configuration, circulation of a target document in a decrypted state may be prevented. However, the exemplary embodiment is not limited to the configuration in which a target document is distributed in an encrypted state. The document management apparatus 100 may hold an encrypted target document until receiving an operation request from a document operator, and may distribute a decrypted target document to the operator terminal 400 if an operation request is received from the document operator and if user authentication succeeds.

In the exemplary embodiment, the document management apparatus 100 and the user authentication apparatus 200 are different apparatuses. Alternatively, for example, the function of the document management apparatus 100 and the function of the user authentication apparatus 200 may be implemented by a single server apparatus.

In the exemplary embodiment, the target to be distributed by the document management apparatus 100 is document data. The target to be distributed is not limited to document data, and any type of data (electronic data) may be distributed, such as audio data or video data.

A program implementing the exemplary embodiment may be provided through a communication medium or may be provided by storing it in a recording medium such as a compact disc-read only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system that grants an access right to data to a registered user, comprising:
   an authentication apparatus including a first processor programmed to:
      determine a registration status of a user;
      create a temporary ID for an unregistered user; and
      create a formal ID for a registered user;
   a hardware data management and distribution apparatus separate from the authentication apparatus, the hardware data management and distribution apparatus including a second processor programmed to:
      receive the temporary ID from the authentication apparatus;
      associate the received temporary ID with an access right to specific data;

distribute the specific data in encrypted form to the unregistered user to which the temporary ID is associated; and in response to receiving a request from the unregistered user to decrypt the specific data for operation on the specific data, when the unregistered user remains to be associated with the temporary ID, deny the request to decrypt the specific data, and when the unregistered user's temporary ID has been converted into the formal ID due to completion of registration, decrypt the specific data.

2. The information processing system according to claim 1, wherein the second processor of the hardware data management and distribution apparatus is programmed to:

set operation information indicating one or more operations that are to be permitted to be performed on the distributed specific data after the specific data distributed in encrypted form is decrypted.

3. The information processing system according to claim 1, wherein the first processor of the authentication apparatus is programmed to:

when the registration of the unregistered user is not completed within a predetermined period after creating the temporary ID for the unregistered user, delete the temporary ID.

4. The information processing system according to claim 1, wherein the second processor of the hardware data management and distribution apparatus is programmed to:

perform control to display a notice prompting the registration if the unregistered user requests an operation to be performed on the distributed specific data while remaining unregistered.

5. The information processing system according to claim 1, wherein the first processor of the authentication apparatus is programmed to:

receive information on the unregistered user when the unregistered user performs the registration; and when the received information does not correspond to predetermined information on the unregistered user, not convert the temporary ID of the unregistered user into the formal ID.

6. The information processing system according to claim 1, wherein the operation on the specific data includes at least one of viewing, printing, and copying of the specific data.

7. The information processing system according to claim 1, wherein the authentication apparatus is a first server, the hardware data management and distribution apparatus is a second server, the unregistered user operates a mobile apparatus, and the first server, the second server, and the mobile apparatus are communicably connected via a network.

8. An information processing method for granting an access right to data to a registered user, performed by a data management and distribution apparatus, the method comprising:

receiving a temporary ID that is created by an authentication apparatus separate from the authentication apparatus, for an unregistered user;

associating the received temporary ID with an access right to specific data;

distributing the specific data in encrypted form to the unregistered user to which the temporary ID is associated; and in response to receiving a request from the unregistered user to decrypt the specific data for operation on the specific data, when the unregistered user remains to be associated with the temporary ID, denying the request to decrypt the specific data, and when the unregistered user's temporary ID has been converted into a formal ID due to completion of registration, decrypting the specific data.

9. A non-transitory computer readable medium storing a program causing a computer of a data management and distribution apparatus to execute a process for granting an access right to data to a registered user, the process comprising:

receiving a temporary ID that is created by an authentication apparatus separate from the authentication apparatus, for an unregistered user;

associating the received temporary ID with an access right to specific data;

distributing the specific data in encrypted form to the unregistered user to which the temporary ID is associated; and in response to receiving a request from the unregistered user to decrypt the specific data for operation on the specific data, when the unregistered user remains to be associated with the temporary ID, denying the request to decrypt the specific data, and when the unregistered user's temporary ID has been converted into a formal ID due to completion of registration, decrypting the specific data.

* * * * *